United States Patent [19]
Kilmer et al.

[11] Patent Number: 5,358,296
[45] Date of Patent: Oct. 25, 1994

[54] SUBSTRATE HOLDING DEVICE

[75] Inventors: David J. Kilmer, Ontario; Geoffrey M. Foley, Fairport; Alexander A. Antonelli, Rochester; Eugene A. Swain, Webster; Mark C. Petropoulos, Ontario; Robert A. Duffy, Webster; John K. Williams, Fairport, all of N.Y.

[73] Assignee: Xerox Corporation, Stamford, Conn.

[21] Appl. No.: 61,098

[22] Filed: May 14, 1993

[51] Int. Cl.⁵ .............................. B66C 1/46
[52] U.S. Cl. .................. 294/98.1; 294/119.3; 294/902
[58] Field of Search ............ 294/64.1, 93, 98.1, 294/99.1, 119.3, 902; 901/39

[56] References Cited

U.S. PATENT DOCUMENTS

| | | | |
|---|---|---|---|
| 3,377,096 | 4/1968 | Wood | 294/64.1 |
| 3,777,875 | 12/1973 | Sabran | 198/131 |
| 3,945,486 | 3/1976 | Cooper | 198/179 |
| 4,146,082 | 3/1979 | Granger | 294/119.3 X |
| 4,168,073 | 9/1979 | LaRue | 294/93 X |
| 4,294,424 | 10/1981 | Teissier | 294/64.1 X |
| 4,561,686 | 12/1985 | Atchley | 294/64.1 |
| 4,680,246 | 7/1987 | Aoki et al. | 430/133 |
| 4,783,108 | 11/1988 | Fukuyama et al. | 294/98.1 |

FOREIGN PATENT DOCUMENTS

| | | | |
|---|---|---|---|
| 2568161 | 1/1986 | France | 294/98.1 |
| 379468 | 4/1973 | U.S.S.R. | 294/98.1 |
| 1202875 | 1/1986 | U.S.S.R. | 294/902 |
| 1284826 | 1/1987 | U.S.S.R. | 294/119.3 |
| 1451002 | 1/1989 | U.S.S.R. | 294/98.1 |

Primary Examiner—Dean J. Kramer
Attorney, Agent, or Firm—Zosan S. Soong

[57] ABSTRACT

An apparatus is disclosed for internally holding an at least partially hollow substrate having at least one open end. The apparatus includes a member defining a fluid passageway, a normally inflated porous material mounted on the member in communication with the fluid passageway of the member, and a mechanism, in communication with the member, for deflating the porous material, the deflating mechanism being de-energized in response to the porous material being disposed into the opening in the substrate for enabling the porous material to return to being normally inflated to hold the substrate.

16 Claims, 2 Drawing Sheets

SUBSTRATE HOLDING DEVICE

This invention relates generally to an apparatus and method for internally holding a hollow substrate. More particularly, the invention pertains to an apparatus and method for holding the inner surface of a hollow substrate by employing a gripping device which normally engages the substrate's inner surface until the device is subjected to a suction force, in which case, the device releases the substrate.

Conventional substrate holding devices grip the insides of a hollow substrate by using an inflatable member which must be inflated or expanded by a mechanical device including for example an air pump.

Known gripping devices are illustrated by the following documents, several of which disclose an inflatable member: Fukuyama et al., U.S. Pat. No. 4,783,108; Aoki et al., U.S. Pat. No. 4,680,246; Cooper, U.S. Pat. No. 3,945,486; and Sobran, U.S. Pat. No. 3,777,875.

There is a need, which the present invention addresses, for new apparatus and methods for internally gripping a hollow substrate which is simple and economical to implement.

SUMMARY OF THE INVENTION

An apparatus for internally holding a substrate having an opening in at least a portion thereof, comprising: (a) a member defining a fluid passageway; (b) a normally inflated porous material mounted on the member in communication with the fluid passageway of the member; and (c) means, in communication with the member, for deflating the porous material, the deflating means being de-energized in response to the porous material being disposed into the opening in the substrate for enabling the porous material to return to being normally inflated to hold the substrate.

A method for internally holding a substrate having an opening in at least a portion thereof, comprising: (a) reducing fluid pressure on a porous material to withdraw fluid therefrom to deflate at least a portion of the material; (b) inserting at least a portion of the deflated material in the opening of the substrate; and (c) terminating at least partially the reducing step so that the porous material takes in fluid and inflates to hold the substrate.

BRIEF DESCRIPTION OF THE DRAWINGS

Other aspects of the present invention will become apparent as the following description proceeds and upon reference to the Figures which represent preferred embodiments.

DETAILED DESCRIPTION

Figure 1:
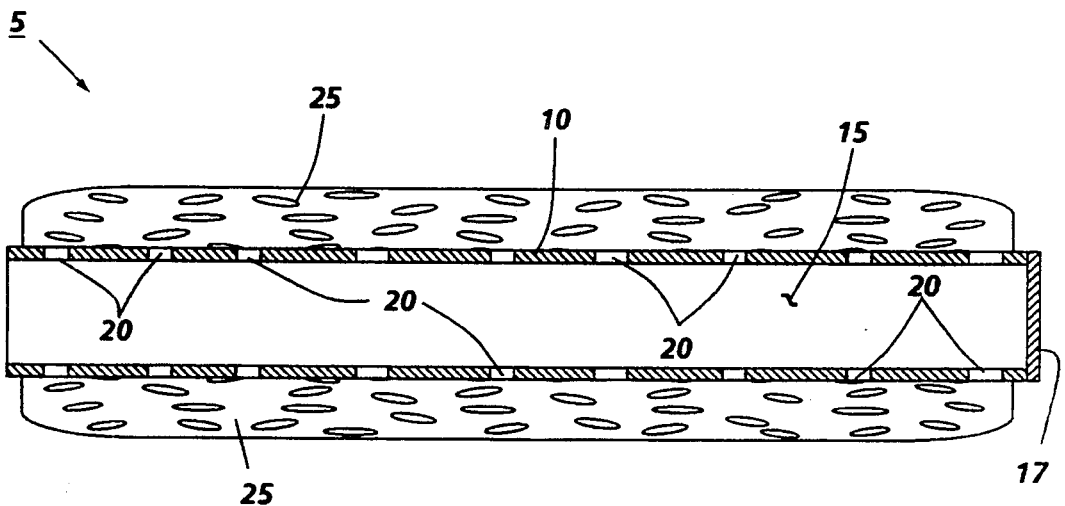
FIG. 1 depicts an elevational sectional view of one embodiment of the substrate holding device.

In FIGS. 1-4, the same or similar components are designated by the same reference numerals.

In FIG. 1, substrate holding device 5 includes cylindrically shaped core member 10 having openings 20 in the circumferential surface thereof, chamber 15 which communicates with openings 20, closed end 17, and porous material 25 which completely covers the outer surface of member 10 in a continuous layer.

Figure 2:
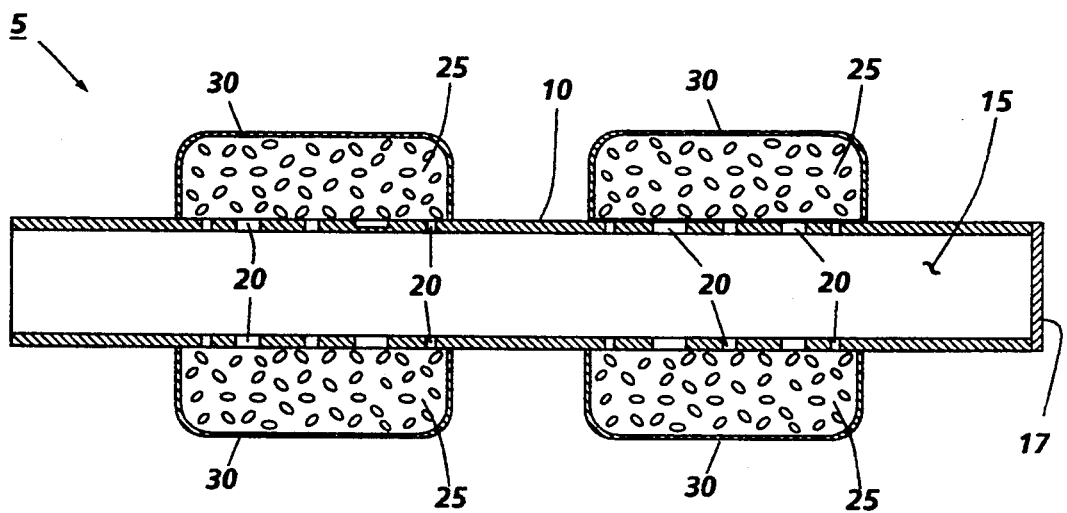
FIG. 2 depicts an elevational sectional view of another embodiment of the substrate holding device.

In FIG. 2, substrate holding device 5 includes cylindrically shaped core member 10 having openings 20 in the circumferential surface thereof, chamber 15 which communicates with openings 20, closed end 17, porous material 25 which is in the form of patches that covers the openings 20, and flexible barrier layer 30 which overlays material 25. In FIG. 2, portions of the outer surface of member 10 are free of material 25.

Figure 3:
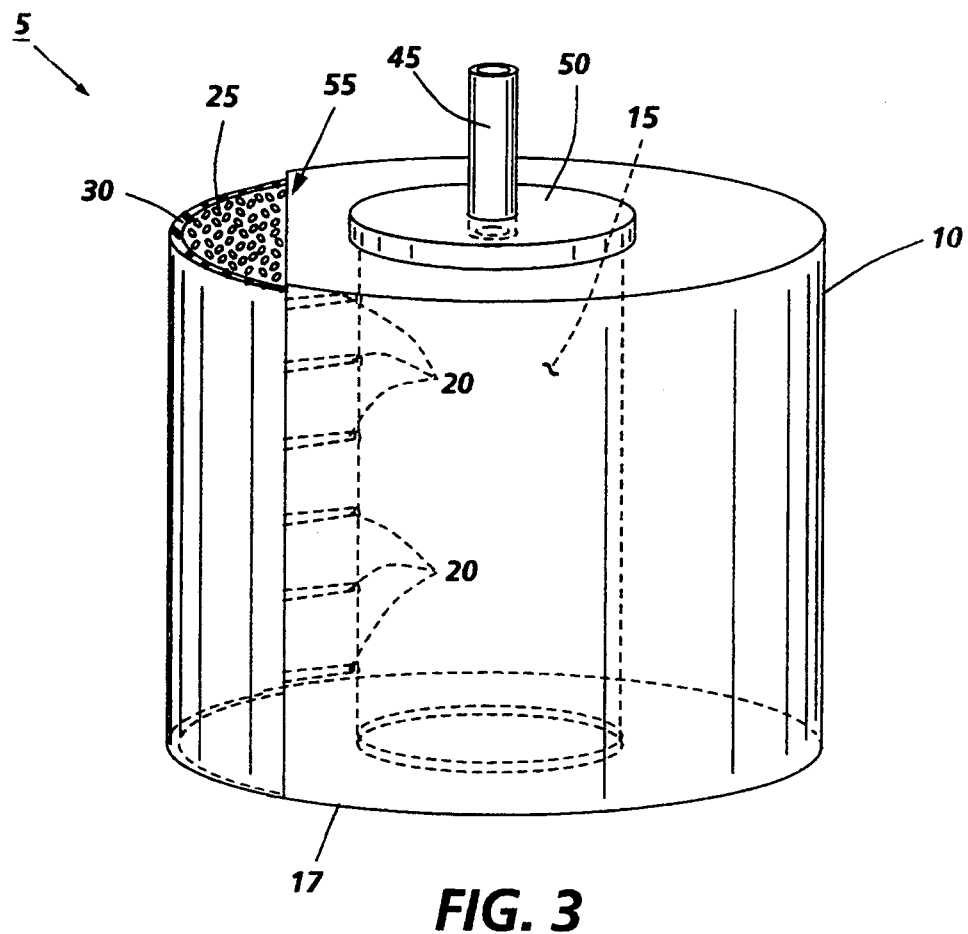
FIG. 3 depicts a perspective view, partially in section, of still another embodiment of the substrate holding device.

In FIG. 3, substrate holding device 5 includes oblong shaped core member 10 having planar end region 55, chamber 15, closed end 17, porous material 25 which is disposed on the surface of planar end region 55, and barrier layer 30 which overlays material 25. Hollow mounting shaft 45 and plate 50 enclose one end of chamber 15 and are thereby coupled and affixed to member 10. Fluid may be withdrawn through shaft 45. In FIG. 3, plate 50 has a diameter larger than that of chamber 15 to facilitate coupling to member 10 in a modified embodiment of FIG. 3, plate 50 and shaft 45 comprise one end of a cylindrical tube which is disposed in chamber 15. In this modified version of FIG. 3, end 17 of core member 10 is closed, the cylindrical tube has a cross sectional diameter that approximates that of chamber 15, and the cylindrical tube has surface openings in communication with openings 20.

In FIGS. 1, 2, and 3, the fluid passageway comprises chamber 15 and openings 20. A suction device (not shown) communicates with chamber 15 to create a suction force that withdraws fluid from material 25 through openings 20, thereby causing porous material 25 to decrease in thickness, i.e., deflate. In embodiments, especially where the material 25 is in a continuous layer such as in FIG. 1, the material may deflate unevenly where material directly over a surface opening deflates more than material located away from the opening. The fluid travels through chamber 15 to be subsequently stored or disposed of in any suitable manner. The porous material may be deflated to any effective thickness suitable for facilitating positioning of the core member into the substrate, preferably decreasing the thickness of the material by an amount ranging from about 10 to about 80%, and more preferably decreasing the thickness of the material by an amount ranging from about 20 to about 40%, based on the original inflated thickness of the material.

Any suitable rigid or flexible substrate may be held by the substrate holding device of the present invention. The substrate may have a cylindrical cross sectional shape or a noncylindrical cross sectional shape such as an oval shape. The substrate may be at least partially hollow, and preferably entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions. Preferred dimensions for a rigid cylindrical substrate are: length ranging from about 5 cm to about 50 cm; outside diameter ranging from about 1 cm to about 30 cm; and wall thickness ranging from about 0.5 mm to about 2 cm. Preferred dimensions for a flexible belt substrate are: length ranging from about 5 cm to about 50 cm; outside diameter ranging from about 3 cm to about 50 cm; and wall thickness ranging from about 0.025 mm to about 0.2 cm.

Figure 4:
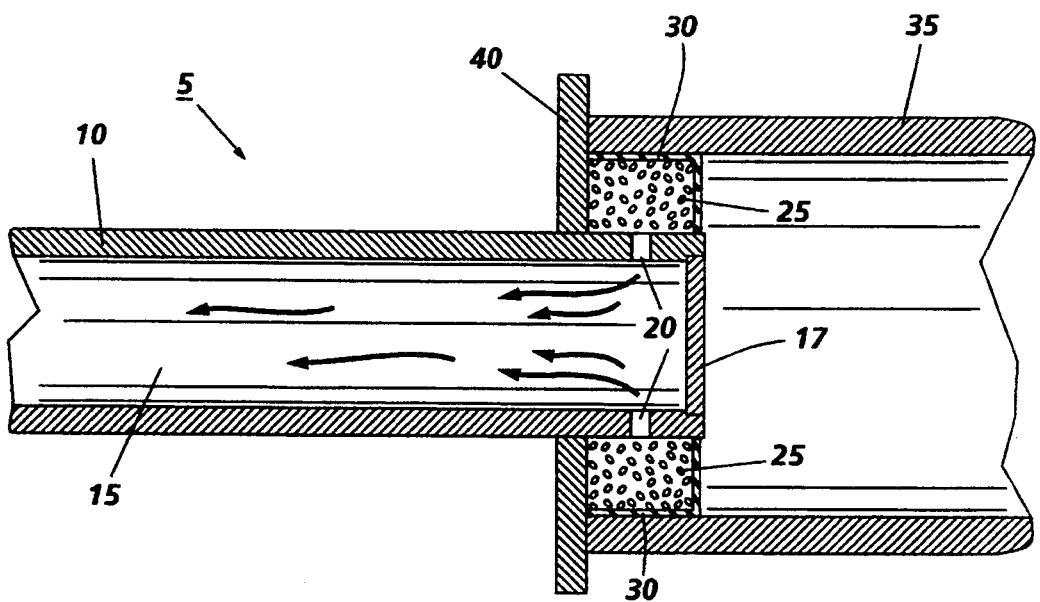
FIG. 4 depicts an elevational sectional view of the substrate holding device disposed within the substrate.

The substrate holding device, wherein a suction force has deflated at least a portion of the porous material, is inserted in the substrate in the manner illustrated in FIG. 4. In FIG. 4, a segment of substrate holding device 5, including closed end 17 and overlaid with deflated porous material 25, is inserted into substrate 35. Flexible barrier layer 30 covers the porous material. Plate 40 is optionally present to help maintain the parallel relationship between the outer surface of device 5 and the outer surface of substrate 35. The substrate holding device may be inserted into the substrate at any effective depth inside the substrate, preferably ranging from about ⅛ to the entire length of the substrate, as measured from the open end of the substrate, and more preferably from about ¼ to about ¾ the substrate length, as measured from the open end of the substrate.

After the substrate holding device is positioned inside the substrate, the suction force is terminated or reduced to an effective level whereby the porous material normally takes in fluid and expands to engage the inner surface of the substrate. The material may expand an effective amount to engage the substrate's inner surface, preferably expanding to about 50 to 100% of the thickness of the fully inflated material, and more preferably about 75 to 100% of the thickness of the fully inflated material. The term "engage" refers to frictional contact between the porous material and the substrate's inner surface or, if a barrier layer is present, between the barrier layer and the substrate's inner surface. In embodiments, the porous material may expand to less than the original inflated thickness due to contact with the inner surface of the substrate, in which case, the expansive pressure exerted by the porous material or the barrier layer against the substrate's inner surface may allow the substrate holding device to more tightly grip the substrate. In embodiments where the flexible barrier layer is present, the barrier layer may act as a hermetic seal thereby preventing the leakage of entrapped fluid from inside the substrate. That the barrier layer may act as a hermetic seal could arise for example where the substrate holding device is employed in the dip coating of the substrate when the substrate is lowered into a solution to coat thereon for instance layered photoconductive materials. In dip coating, the barrier layer, acting as a hermetic seal, may function to trap air between the solution poised to contact the interior surface of the substrate and the end of the substrate holding device. Trapping air between the solution at the substrate bottom and the end of the substrate holding device may be desirable in embodiments to prevent the solution from coating the interior surface of the substrate, thereby minimizing the use of solution; in some embodiments, a coated substrate interior surface may be of little or no use in the fabrication of for example photoreceptors.

The core member may be of any suitable configuration and composition to incorporate a fluid passageway. The phrase fluid passageway refers to one or more pathways in the core member which permit withdrawal of fluid away from the porous material through the member to preferably a collection or disposal area. The fluid passageway of the core member is in communication with the pores of the porous material for the movement of fluid. The term pores or porous refers to minute openings or channels, typically interconnected, which admit the passage of a fluid. The phrase fluid passageway encompasses one or all of the following: a chamber within the member, openings connecting the chamber and the porous material, and pores in the wall and/or the interior of the member. In embodiments employing openings to the surface of the core member, the openings may be of any effective number such as one, two, three, four, and the like; the surface openings may be arranged in any effective pattern on the core member surface including random, spacing at regular intervals, and the like. Due to the nature of the porous material, fluid may travel to a surface opening or pore in the surface of the member from a location in the porous material remote from that surface opening or pore. The term fluid refers to a liquid such as water, and the like, or a gas such as air, nitrogen, and the like.

The core member may have a cylindrical, oblong, or oval cross sectional shape and may be at least partially hollow or entirely hollow. The core member in embodiments may be tubular as illustrated in FIGS. 1, 2, and 4 or may be oblong shaped with a planar end region as illustrated in FIG. 3. In embodiments, the core member may be a solid piece of, for example, a porous substance made from a porous material of the type disclosed herein such as plastic foam. Also, the core member may be fabricated from a porous material such as foam which comprises a chamber optionally with channels to the surface. In embodiments, the core member has at least one closed end to facilitate the creation of a suction force; the other end may be coupled to the suction device. The core member may be flexible but preferably is rigid, especially for holding substrates in the photoreceptor fabrication process. Suitable materials for the core member include metal such as stainless steel, aluminum, copper, iron, and the like; and plastic such as thermoplastic polymers unreinforced (e.g., polyethylene, polyvinyl chloride, ABS polymers, and polypropylene) and thermosetting polymers (e.g., polyesters, phenolics, and epoxies) blended for instance with 60 to 80% by weight of glass fibers. The core member may also be wholly or partly made from a porous material of the type disclosed herein and preferably is a rigid plastic foam such as polystyrene, polyurethane, epoxy, and polyvinyl chloride. The plastic foam may be open cell or closed cell. The core member may be of any suitable dimension. For example, for a hollow member having a cylindrical cross section like in FIGS. 1 and 2 or an oblong cross section like in FIG. 3, the member may have the following preferred dimensions: a length ranging from about 3 cm to about 20 cm, an outside diameter ranging from about 1 cm to about 20 cm, a wall thickness ranging from about 1 mm to about 5 cm; and an outside diameter ranging from about 1 cm to about 20 cm. The above dimensions will vary by the size of the substrate being held.

The porous material may be fabricated by any suitable process including for example drilling a plurality of holes into the material and conventional methods to produce plastic foam.

The porous material may be any suitable material which normally remains inflated unless subjected to a suction force that withdraws fluid from the material, thereby deflating the material; the deflated material normally takes in fluid and inflates when no longer subjected to the suction force or subjected to a reduced suction force. The term normally indicates that the porous material can retain or take in fluid without the use of any mechanical device including a fluid injection apparatus, pump, and the like. Although a mechanical device may be employed, the porous material has the capability to remain inflated or to take in fluid without such equipment based on the inherent properties of the material. One preferred way of characterizing the porous material is a soft, sponge-like material. In embodiments, the porous material may take in fluid from ambient conditions such as from the air surrounding the material. Where a barrier layer covers the porous material, the material may take in fluid for example from the fluid passageway of the core member once the suction force ends or is effectively reduced since the pores of the porous material communicate with the fluid passageway. The time required to inflate or deflate the porous material may be any suitable time, preferably ranging from about 0.5 second to about 5 minutes, and more preferably from about 1 second to about 5 seconds.

The porous material preferably is plastic foam. In embodiments, closed cell foam may be used in the porous material but open cell foam is preferred. Open cell foam is available for example from the Rogers Corporation (Rogers, Conn.). Preferably, the porous material has sponge-like qualities such as resilience, and may be a plastic foam such as polyurethane, rubber latex, polyethylene, vinyl polymers, or other elastomers and the like. The porous material has an effective thickness which when deflated permits insertion of a portion of the apparatus into the substrate and which when inflated inside the substrate expands to permit the material or the optional barrier layer to engage the inner surface of the substrate. Preferably, the porous material has a thickness, when not subjected to a suction force, ranging from about 1 mm to about 5 cm, and more preferably about 10 mm to about 3 cm. The substrate holding device, i.e., the core member, porous material, and the barrier layer (if present), when not subject to a suction force, has an outer cross sectional dimension equal to or larger than the inner cross sectional dimension of the substrate. Preferably, the outer cross sectional dimension of the substrate holding device, when not subject to a suction force, exceeds the inner cross sectional dimension of the substrate by an amount ranging from about 2 to about 50%, and more preferably from about 5 to about 25%, based on the substrate dimension.

The porous material covers an effective portion of the outer surface of the core member. In embodiments, the porous material covers the entire outer surface of the member in a continuous layer. In other embodiments, the porous material is in the form of one or more patches which cover the surface openings in the core member and extend an effective distance beyond the edge of the surface openings, preferably from about 2 mm to about 2 cm, and more preferably from about 4 mm to about 10 mm beyond the edge of the surface openings. The patches may be of any suitable shape including round, oval, square, and the like. In embodiments, the porous material may be in the form of a strip which extends along a part or all of the length of the core member as illustrated for example in FIG. 3. The porous material may have an uniformly flat surface which may provide a hermetic seal during for example dip coating of the substrate, a surface containing a number of peaks and valleys, or any suitable surface appearance.

Any suitable method may be employed to attach the porous material to the surface of the core member including the use of an adhesive such as contact cement, pressure sensitive silicone or cyanoacrylate may also be used to glue the barrier layer to the porous material. The adhesive may be selectively applied so that it does not substantially block communication between the pores of the porous material and the fluid passageway. The adhesive layer may be of any effective thickness, preferably having a thickness ranging from about 0.5 mm to about 3 mm.

The barrier layer is substantially impermeable to a fluid and may cover an effective portion or all of the exposed surface of the porous material. The term exposed refers to the surface of the porous material which is not in contact with the core member and includes for example the top and side surfaces of the porous material. The purpose of the barrier layer is to prevent atmospheric air or some other fluid from entering the pores of the porous material because such fluid entry may prevent the suction force from fully or partially deflating the porous material. Incomplete or no deflation of the material may occur when the suction force withdraws fluid from the porous material at the same rate or at a lower rate than the rate of fluid entering the pores of the material. The porous material need not be fully deflated; partial deflation may be useful in certain embodiments. The barrier layer may be fabricated from any suitable material. Illustrative materials include rubber, silicone rubbers, fluoroelastomers, and polyurethanes. Any suitable method may be used to overlay the porous material with the barrier layer including spraying, coating, and molding. An adhesive such as contact cement, pressure sensitive silicone or cyanoacrylate may also be used to glue the barrier layer to the porous material. The adhesive layer may be of any effective thickness, preferably having a thickness ranging from about 0.5 mm to about 3 min. The barrier layer has an effective thickness, preferably from about 0.2 mm to about 2 cm, and more preferably from about 0.5 mm to about 10 mm.

Any suitable suction device may be employed for creating the suction force including for example a vacuum pump. The suction device in embodiments is coupled to an end of the core member and the device communicates with the fluid passageway of the core member. An effective suction force is employed to deflate the porous material, preferably ranging from about 700 to about 20 torr, and more preferably from about 500 to about 100 torr. To inflate the porous material, the suction force may be terminated or reduced by an effective level, preferably reduced by an amount ranging from about 20 to about 95%, and more preferably from about 50 to about 90% based on the original suction force. To release the substrate from the substrate holding apparatus, an effective suction force is created in the amount as disclosed herein to deflate the porous material.

Other modifications of the present invention may occur to those skilled in the art based upon a reading of the present disclosure and these modifications are intended to be included within the scope of the present invention.

We claim:

1. An apparatus for internally holding a substrate having an opening in at least a portion thereof, comprising:
   (a) a member defining a fluid passageway comprised of a chamber and an opening on the surface of the member in communication with the chamber;
   (b) a normally inflated porous material mounted on the member in communication with the fluid passageway of the member, wherein the porous material lies on top of the opening and extends beyond the edge of the opening along a portion of the surface of the member; and (c) means, in communication with the member, for deflating the porous material, the deflating means being de-energized in response to the porous material being disposed into the opening in the substrate for enabling the porous material to return to being normally inflated to hold the substrate.

2. The apparatus of claim 1, further comprising a flexible barrier layer which overlays the porous material.

3. The apparatus of claim 2, wherein the barrier layer comprises rubber.

4. The apparatus of claim 1, wherein the deflating means comprises a suction device which communicates with the fluid passageway of the member for creating a suction force.

5. The apparatus of claim 1, wherein the member has a closed end.

6. The apparatus of claim 1, wherein the member is tubular.

7. The apparatus of claim 1, wherein the member is substantially rigid and is made from a metal or a plastic material.

8. The apparatus of claim 1, wherein the porous material covers the entire outer surface of the member in a substantially continuous layer.

9. The apparatus of claim 1, wherein the porous material covers selected portions of the outer surface of the member.

10. The apparatus of claim 1, wherein the member comprises a substantially planar end region, with the porous material disposed on the surface of the planar end region.

11. The apparatus of claim 1, wherein the porous material comprises open cell foam.

12. The apparatus of claim 1, wherein the normally inflated porous material has a thickness ranging from about 1 mm to about 5 cm.

13. A method for internally holding a substrate having an opening in at least a portion thereof, comprising:
  (a) reducing fluid pressure on a normally inflated porous material to withdraw fluid therefrom to deflate at least a portion of the material;
  (b) inserting at least a portion of the deflated material in the opening of the substrate; and
  (c) terminating at least partially the reducing step so that the porous material normally takes in fluid and inflates to hold the substrate.

14. The method of claim 13, wherein the reducing step (a) comprises decreasing the thickness of the material by an amount ranging from about 10% to about 80%.

15. The method of claim 13, Wherein the inserting step (b) comprises positioning the deflated material inside the substrate along a length of the substrate ranging from about $\frac{1}{4}$ to about $\frac{3}{4}$ of the substrate length.

16. The method of claim 13, wherein a flexible barrier layer overlays the porous material.

* * * * *